United States Patent [19]

Morris et al.

[11] 3,989,228
[45] Nov. 2, 1976

[54] MIXING AND DISPENSING APPARATUS

[75] Inventors: Lester Morris, Encino; Dennis Perkins, Gardena, both of Calif.

[73] Assignee: Products Research & Chemical Corporation, Burbank, Calif.

[22] Filed: Aug. 26, 1975

[21] Appl. No.: 607,754

Related U.S. Application Data

[63] Continuation of Ser. No. 443,300, Dec. 19, 1974, abandoned.

[52] U.S. Cl. ............................... 259/4 AC; 259/36; 259/95; 259/DIG. 1
[51] Int. Cl.² ...................... B01F 15/00; B01F 5/12
[58] Field of Search ............. 259/4 R, 4 AC, 18, 36, 259/98, 99, 95, 182, 185, DIG. 1; 239/113, 412, 416.3; 222/133, 134

[56] References Cited
UNITED STATES PATENTS

| | | | |
|---|---|---|---|
| 2,210,934 | 8/1940 | Gleason | 239/113 |
| 3,008,808 | 11/1961 | Hodges | 239/133 |
| 3,361,412 | 1/1968 | Cole | 259/4 AC |
| 3,390,814 | 7/1968 | Creighton | 259/113 |
| 3,741,441 | 6/1973 | Eberle | 222/145 |

*Primary Examiner*—Edward L. Roberts
*Assistant Examiner*—Robert Pous
*Attorney, Agent, or Firm*—Poms, Smith, Lande & Glenny

[57] ABSTRACT

A static mixing chamber for mixing multi-component compositions has the provision of having the mixing chamber at the outlet of the feed lines. A valve is at the outlet end of the chamber. By having the chamber near the outlet end, a large pressure drop across the chamber is insured. Moreover, the valve at the end of the chamber insures that the large pressure drop will be maintained even during start-up of dispensing. By increasing the pressure drop over the chamber, mixing therethrough has been greatly enhanced. Therefore, a smaller mixture is required for effective mixing. The result in small size makes the static mixer capable of being hand held, in the form of a dispensing gun and the valve actuator is part of the dispensing gun so that the valve can be operated by the same hand that is holding the gun.

17 Claims, 4 Drawing Figures

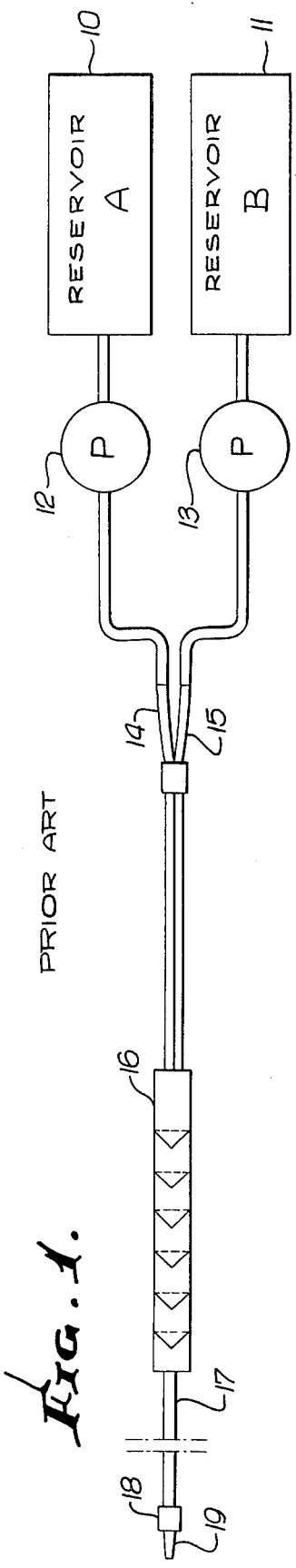
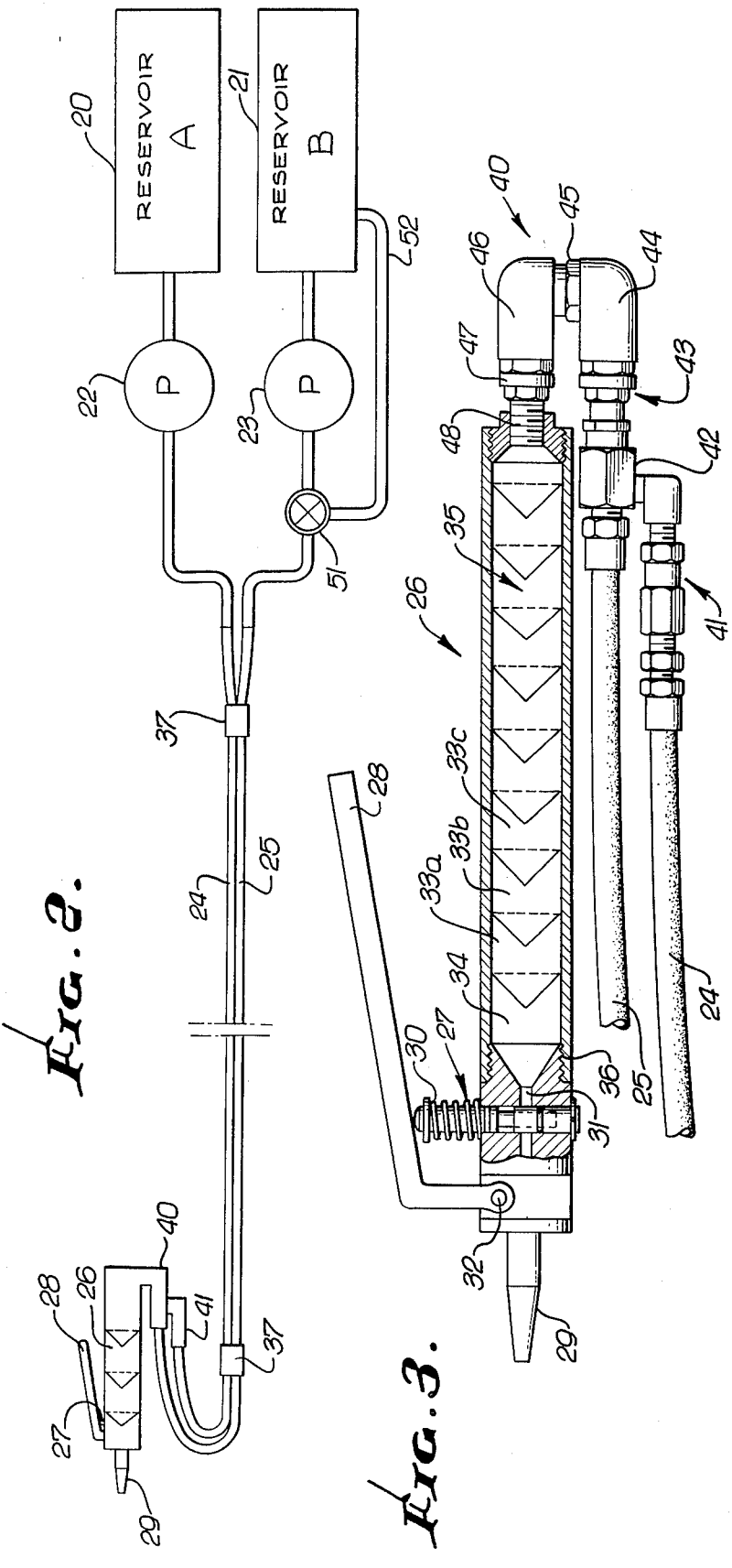

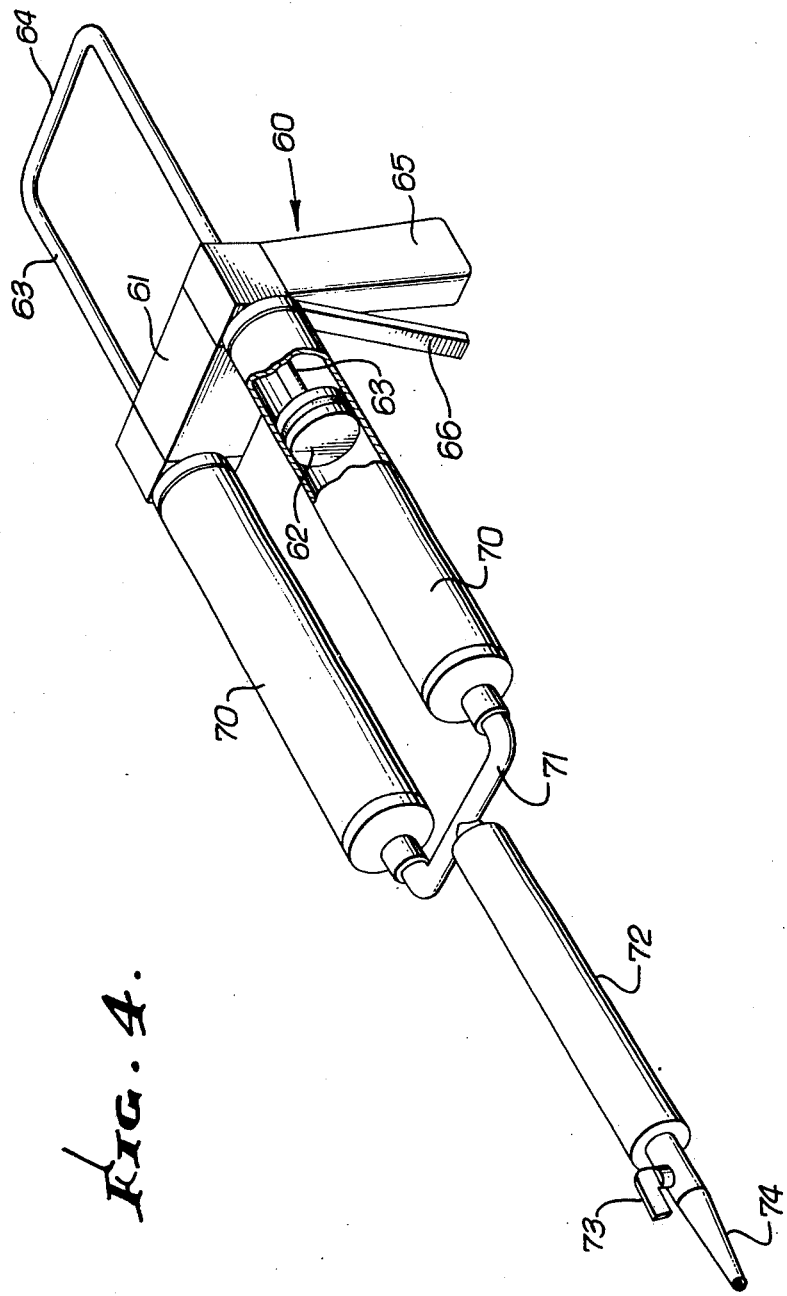

MIXING AND DISPENSING APPARATUS

This is a continuation, of application Ser. No. 443,300, filed Feb. 19, 1974 now abandoned.

BACKGROUND OF THE INVENTION

In the field of "curable" or cross-linking plastics and rubbers, those which can be cured at room temperature have been of great commercial value. Typically, two or more liquids or pastes are combined in predetermined ratios to bring about a chemical conversion to a solid plastic or rubber. The earliest application of this idea consisted of two fluids which were placed together in a single container and mixed until uniform. The uniform mixture was then placed into appropriate application equipment and then applied. Those procedures were reasonable for low viscosity products which remained fluid for a long period of time. However, with high viscosity fluids, or those which cure very rapidly, batch processing is not practical.

Various mixing arrangements have been devised to overcome those disadvantages. For example, in U.S. Pat. No. 3,144,966 to Cook, a two-chambered dispenser is provided for mixing the fluids together. Another example consists of pumping the material through mechanical mixing devices placed just before the point of application. These devices have generally been too awkward and heavy because a driving mechanism and power source must be supplied to the mixing head. Moreover, when the size was minimized to allow for some mobility, the mixing mechanisms has to operate at higher speeds for more effective mixing. The higher speeds produced local overheating and curing of the materials. Cleaning of the mechanisms has been very difficult and if material cures inside the driving mechanism, an expensive piece of equipment may be lost.

Static mixing devices have been employed to overcome the disadvantages of mechanical mixing. For example, Harder, U.S. Pat. No. 3,404,869 and U.S. Pat. No. 3,583,678 show typical static mixing devices. In prior art devices utilizing static mixers, it was common to mount the static mixer near the source of supply, then extend tubing from the mixer to a dispenser. It was found that a long and bulky static mixing chamber was needed to affect proper mixing. The chamber was mounted on a permanent support and the material flowed through a flexible hose to a hand-held dispenser. However, because the chamber and the flexible hose leading from the chamber was filled with mixed materials, the materials would have to be removed from the respective elements in order that they not cure within the chamber and hose. As the length of the hose increased, the amount of material inside the hose increased so that as a result, each time the device was shut down, a large amount of material would be lost.

With the prior systems, an auxiliary solvent system had to be provided to clean out the mixing chamber and the fluid line. Not only does this add another line into the system, but requires the consumption of large amounts of solvent. The loss of solvent is especially important because most solvents are hydrocarbons derivatives which are becoming more scarce and costly.

An additional problem with such prior art devices is that if the final material is of rapid curing, it must be dispensed out the dispensing end prior to curing. As the curing time decreases, it may be possible that the material will not flow all the way out of the hose and dispensing end prior to curing. This can either result in internal curing which will result in the loss of the equipment, or will limit the length of the hose leading from the mixing chamber. Any limiting of the length of hose is undesirable in that it limits portability to the dispensing end of the device. Even if the hose is short enough so that material will not be cured when it leaves the dispensing end, if the flow is interrupted for even a short period of time, the curing time may be reached within the hose or the chamber and the equipment could be ruined. In certain instances, it became practical to maintain the flow through the system even though the resulting compound had to be wasted because shutting the system down even for a brief time risked expensive equipment.

It is therefore an object of this invention to provide a portable dispensing apparatus for dispensing a composition of at least two materials. This should be done to minimize the potential lost of equipment resulting from curing of material within the system. A further object is to eliminate the secondary solvent system for cleaning materials from within the system. It is desirable to eliminate the waste of solvent and waste of extra components of the mixture. Another object is to improve the mixing of the system while using a smaller static mixer. Still another object of the invention is to provide a device wherein material can be dispensed from a portable, hand-held device which can be directed in any location to localize the application of material and wherein a valve actuator is located on the hand-held device to control the application of materials.

SUMMARY OF THE INVENTION

It has been found, quite unexpectedly, that increasing the pressure drop across the mixing chamber improves the functioning of the static mixer. This high pressure must be maintained for all viscosities of fluid and for all flow rates. Using this teaching, by maintaining high pressure at the inlet of the static mixer, a shorter static mixer can out-perform longer ones. In order to apply this teaching to an applicating system, the static mixer is placed at the downstream end of the supply hose and pumps at each source of material pressurize the supply line upstream of the mixing chamber. The dispensing end which includes a valve is located adjacent the downstream end of the static mixing chamber, and material is dispensed in its desired location from such dispensing means. Therefore, the pressure drop across the static mixer equals the pressure at the upstream end of the static mixer at the downstream end of the feed lines minus the pressure at the outside of the dispensing means. This contrasts to the prior art system wherein there is a long pressure drop from the tubing leading from the downstream end of the static mixing chamber to the dispensing means so that the pressure drop over the static mixer is decreased.

It has also been found that because of the small volume of mixed materials held within the static mixing chamber and the dispensing means, if only one material is forced through the mixing means, the material, by itself, will drive the remaining mixed materials out of the static mixing chamber and the dispensing means. A very low volume of the single material is needed to accomplish this and no additional solvent system or the like is required. Because a smaller static mixing chamber can be used, it has been found that it can be connected to the end of the delivery hoses and hand held.

This provides great advantages in directing the flow of material from out of the dispensing means. Also, a valve actuator is provided on the mixing chamber so that it can be operated by the same hand which holds the mixing chamber. Even with very fast curing chemicals, they can be removed from the static mixing chamber quickly by the flow of one material through the chamber. No intermediate hose must be cleared of the mixed material. The entire apparatus allows for great flexibility because the length of the delivery hose from the source of material to the static mixing chamber can be increased, and the effectiveness of the static mixing chamber can be compensated for by any increase of the delivery hose length by merely increasing the pressure within the delivery hose. From a stationary pump and source station, the operator holding the dispensing end can move a great distance from the stationary source so that he can work more efficiently.

The following examples illustrate the advantages of the invention:

Example I. A hollow tube ½ inch × 32 inches, filled with 1½ inches long segments of alternately left-and-right handed screws, actually oriented as taught in U.S. Pat. No. 3,286,992 to Armeniades et al, was mounted in an apparatus and supplied with two-component material having a mixed viscosity of 2,000 poise. An 8-foot hose was attached to the outlet along with a valve. At 600 psi, unmixed streaks of material emerged continuously but were worse at the beginning of each start-up cycle. The 8-foot hose was removed and the exiting material became a uniform mixture. Thereafter, the 32 inch hollow tube was replaced with a unit 24 inches long and the material was still well mixed.

Example II. A hollow tube 1 inch in diameter and 8 inches long filled with eight drilled polypropylene segments made according to the teaching in U.S. Pat. No. 3,538,678 to Harder, was placed at the end of the 8-foot line, and the same material was used as in Example I. At 400 psi, a delivery rate was ½ gallon per minute. If a valve was placed before the mixing chamber, inadequate mixing was observed at startup. By placing the shutoff valve after the mixer, uniform mixing was obtained at all flow rates.

Example III. The same physical combination as in Example II was employed, but a truely fluid mixture of 150 poise was used. Even with the valve at the downstream end of the static mixer, unmixed material emerged both at the beginning and during the cycle. A smaller mixer, still in accordance with the teaching of the Harder patent, with the dimensions of ⅝ inch × 5 inches, but still using eight drilled polypropylene segments replaced the larger mixer and mixing was complete.

BRIEF DESCRIPTION OF THE DRAWINGS

FIG. 1 shows a schematic of the prior art device.

FIG. 2 shows a schematic of the device of the instant invention.

FIG. 3 shows a cross-sectional view of the mixing chamber and valve mechanism at the end of the delivery tubes of the device in FIG. 2.

FIG. 4 shows an alternative embodiment of the present invention.

DETAILED DESCRIPTION OF THE PREFERRED EMBODIMENT

A device for dispensing a multi-component composition is shown which includes a mixing means for mixing the multiple components of the composition together. Pressurized supply means supply the separate components from separate sources to the upstream end of the mixing means at an elevated pressure to force material through the mixer and to maintain a high pressure in the mixing means. A valve at the downstream end of the mixing means dispenses the composition to the desired location outside the apparatus and maximizes the pressure drop over the mixing means. Purge means are included to recycle one of the components of the composition from upstream of the mixing means back to the respective source of the component. The other component is driven through its respective delivery tube to the mixing means and that component forces the mixture from within the static mixer out the valve means. The static mixing means is connected to the end of the delivery hoses by a swivel fitting which allows the static mixer to be oriented as desired and the valve which is part of the dispensing means can be placed in a desired location to direct the flow of materials therefrom. The valve is controlled by a valve actuator which has a handle proximate the mixing chamber so that a operator can hold the mixing chamber and handle in one hand and thereupon control the flow of material both in amount and in direction from the dispensing means.

Referring now to FIG. 1, the prior art device is shown in schematic. Reservoir A 10 is the source of supply of a base material and is driven by pump 12 through the line 14 to the static mixer 16. The catalyst or accelerator is housed in reservoir B 11 and is similarly driven by pump 13 through the line 15 to the static mixer 16. Thereafter, the components are mixed in the static mixer and are driven through the tubing 17 to the dispenser 18 with nozzle 19 thereattached.

Referring now to FIG. 2, pressurized supply means supply the separate components from separate sources to the upstream end of the static mixing means at an elevated pressure to force material through the mixer and to maintain a high pressure therein. In the exemplary embodiment, the pressurized supply means includes pumps 22 and 23 which supply base material from reservoir A 20 and catalyst material from reservoir B 21 respectively to the upstream end of the mixing means through delivery means 24 and 25. The pumps 22 and 23 are adapted to maintain an elevated pressure within the delivery means 24 and 25 and within the mixing chamber 26. In the preferred exemplary embodiment, material containers or drums containing either base or catalyst are first placed under elevators which are simple frameworks with air-powered pistons which exert pressure on the material surface. Mated to the elevators are the material pumps. The elevator system is not shown in the drawings. In the preferred embodiment, the material pumps operate in the same manner for both base and catalyst materials. Preferably, they are air powered, with reciprocating units which move material on both up and down strokes thus minimizing pressure surges from the pumps. The materials move to metering cylinders which are positive displacement continuous flow units which are rigidly linked together to provide constant proportioning of catalyst to base.

From the metering cylinders, the material passes through the delivery hoses 24 and 25 to the mixing means 26 which mixes the respective components together. The delivery hoses are held together by a number of bands 37. Valve means 27 is at the downstream end of mixing means to dispense the composition to the desired location outside the apparatus and minimize the pressure drop over the mixing means. The minimization of pressure drop is accomplished by the fact that the material in lines 24 and 25 is at a very high pressure. There is essentially no pressure (except ambient pressure) acting on the material at the outlet end of the nozzle 29. As shown in FIG. 3, the dispensing means is attached by appropriate means to the downstream end of the mixing means to said housing. The very short distance from the downstream end of the mixing means to the end of the nozzle 29 results in a very small drop in pressure. The pressure drop over lines 24 and 25 can be adjusted for so that a certain pressure is obtained at the upstream end of the mixing means. Then the entire pressure drop occurs over the mixing means because the pressure drop from the downstream end of the mixing means to the end of the nozzle is essentially zero. However, in the prior art system shown in FIG. 1, the pressure at the downstream end of the mixing chamber is not zero because there is a substantial pressure drop over the delivery tube 17. Therefore, the pressure drop in the mixing means in the prior art device is less than in that of the instant invention even though the mixing means in the prior art device is substantially longer than that of the present invention.

One advantage of having the valve at the downstream end of the mixing means is that pressure can be maintained over the whole system. In prior art devices, it is common to have the shut-off valve upstream from the static mixer near the pumps. When the upstream valve is shut off, the pressure in the system slowly dissipates and consequently the pressure drop across the static mixer also falls off. Also, when the upstream valve is opened, the pressure drop across the static mixer will build slowly. During these pressure changes, material is still moving from the dispenser and from the downstream end of the static mixer. While material is passing through the mixer at low pressure the mixer mixes poorer than if the pressure is maintained at a high level. Therefore, it is advantageous to have the valve immediately after the downstream end of the static mixer to maintain higher pressure on the mixer during start-up and shut-down.

Referring now to FIG. 3, the static mixer is shown in more detail, and is in the configuration of a gun. Lines 24 and 25 are attached to the static mixer by means of a swivel fitting 40. In the exemplary embodiment, line 24 is attached through connector 41 to fitting 42 to which line 25 is also connected. The fitting 42 is attached to connector 44 by means of a swivel fitting 43 so that fitting 42 is free to rotate with respect to connector 44. Likewise, connector 44 is free to rotate with connector 46 through its swivel fitting 45, and connector 46 is connected to a rear connector 48 in the mixing means by means of a third swivel connector 47. By means of these swivel fittings, the mixing means 26 can assume any desired orientations so that the nozzle 29 can be placed adjacent the desired location and at the correct angle. It is also possible to have only two swivel connectors and still have relative freedom of movement.

Material becomes partially mixed in the fitting 42 but after it leaves the connector 48 it enters the static mixing chamber 35. Inside the mixing chamber are a plurality of mixing segments 33a, 33b, 33c, etc. The mixing segments are preferably formed out of drilled polypropylene segments according to U.S. Pat. No. 3,583,678, supra. Where the material is thoroughly mixed, the last mixing segment is a mating segment 34 adapted to mate with the outlet 31 adjacent the valve 27.

The valve means is in the dispensing means of the device and includes a spring 30 to maintain the valve 27 in its upright or closed position. Applying downward force to the handle 28 causes it to pivot clockwise about the pivot 32 and push downward on the valve means 27. This opens the outlet 31 and allows material to flow through the dispensing means and into the nozzle 29 and thereafter out of the device. It should be noted that the valve and dispensing means are screwed into the chamber 35 at the screw means 36. If cleaning ever becomes necessary, the valve and dispensing means can easily be removed and the polypropylene segments can be removed for cleaning. It has been found that even if the material within the chamber becomes cured, if the dispensing means is unscrewed from the chamber and the flow of material begun, the pressure will force the polypropylene segments out the downstream end of the chamber. Thereafter, they may be soaked in a solvent, cleaned and reused. Of course, this latter procedure should not have to be resorted to if the device is used properly.

Purge means are provided to recycle at least one component of the composition from upstream of the mixing means to the respective source of the first component of the composition. The flush means further includes means to drive at least one other component through the mixing means when the first component is recycled to its source so that the other component drives the remaining mixture through the mixing means and the valve means to remove the first composition from the mixing means and the valve means. In the exemplary embodiment, the purge means comprises a catalyst bypass purge system. The catalyst is diverted back to the reservoir B 21 while the base material flows through the mixing chamber forcing out the mixed material. A bypass valve 51 is normally in a position such that material flows from the reservoir B through the pump 23 and into the line 25, however in its purging mode, the valve 51 is arranged so that material coming from the pump 23 is directed through the line 52 and back into reservoir B. The flow of material back into reservoir B is at the same rate as material would have been flowing through the line 25 had the valve been oriented to accomplish that. Accordingly, pump 22 is forcing material through line 24 at its same rate so that only the base material will then enter the mixing chamber 34. The base material drives out the mixed material in front of it until finally, the mixing means 26 is filled only with base material and no catalyst or mixed material is present. With no catalyst present, the material cannot cure within the static mixer.

Because most of the volume inside the mixing means is filled with the polypropylene segments, there is little volume of material within the mixing chamber. Therefore, the amount of material lost in the flushing operation is very small. In the prior art, however, with larger static mixers and a line leading therefrom, the amount of material lost can be very great. Moreover, in some of the prior art devices, a flushing system was needed which increased the cost of the system greatly because a second pumping system was needed to accomplish the flushing operation. Not only was the solvent used expensive, but by completely cleaning out the system, the problems mentioned with start-up were accentuated.

It has been found, for example, that in the 1 inch × 8 inch mixer with drilled polypropylene segments requires only 5 ounces of viscous base material (2,000 poise) for adequate cleanout. This contrasts substantially with the many gallons of circulating solvents traditionally used for cleaning lines and mixers.

A further advantage from having the valve and outlet end immediately after the static mixer is that materials with very rapid setting times can be handled without risk of damage to the system. For example:

Example IV. A two-component, foaming polyurethane-based composition of 100 poise mixed viscosity and with a setting time of 30 seconds was passed through a ⅝ inch × 5 inch mixer similar to the one taught in U.S. Pat. No. 3,583,678, supra. When the flow was stopped, the purge means was activated to shut off the catalyst portion while the base purged the chamber of the mixture. The gun was allowed to stand for 30 minutes and then restarted with both components. Properly mixed materials emerged at a rate equal to the initial charge and cured normally.

The invention can also be applied to an entirely hand-held model. Two cartridges 70 are the sources of the fluid material. One cartridge holds base material and the other contains accelerator or catalyst. The cartridges 70 are supported on support means 61 of the hand-held mixing gune 60. Driving means including piston means 62 and ram means 63 which moves the piston means 62 in the cartridge 70 to apply a pressure on the material therein. The pressure forces the material from within the cartridge through the connector fitting 71, and into static mixer 72. The material is mixed within the static mixer and is dispensed through the nozzle 74.

Valve 73 controls the flow of material from the static mixer to the nozzle. By use of the valve, a higher pressure can be maintained over the mixer which provides better mixing therein.

Ram mens 63 is driven by a ratchet mechanism (not shown) similar to those common is single cartridge dispensors except two ratchets are used, one for each side of the ram so that both rams move together. The ratchet is operated by squeezing together the handle 65 and the trigger 66, both of which are mounted on the support means 61. The trigger moves a given distance causing a shorter movement of the ram means 63. This mechanical advantage allows a large pressure to be applied to the fluids via the pistons 62.

Interconnector arm 64 connects the two ram means to insure that they will move together. The amount of material dispensed from the cartridge is varied according to the diameter of the cartridge. By varying the dimensions of each cartridge, the exact proportions of each fluid can be used.

The alternative embodiment is especially compact and allows much portability. In field applications, the total amount of mixture is usually small. The hand-held gun fulfills this need. The compact size is obtained using the teaching of mounting the static mixer very near the end of the entire system. With the valve immediately downstream of the mixer, high pressure can be maintained even in the hand-held gun.

Thus, a device for dispensing a mixture of component fluids including a plurality of sources of fluid, mixing means to mix the fluids together to form a substantially mixed composition of the fluid, dispensing means to dispense the composition out of the device and driving means to drive the plurality of fluids through the mixing means and out of the dispensing means has been improved according to the following provisions. The mixing means are proximate to the dispensing means so that the mixture from the mixing means passes directly to the dispensing means to minimize the pressure drop between the mixing means and the dispensing means to maximize the pressure drop through the mixing means. The dispensing means includes a valve means for selectively allowing and preventing the flow of mixture through the dispensing means. Means are provided to maintain an elevated pressure on the fluid in the mixing means when the valve means is preventing flow through the dispensing means. The dispensing means is connected to the mixing means so that orienting the mixing means to a desired location orients the dispensing means accordingly. Delivery means delivers the fluid to the mixing means and swivel fitting means connects the mixing means to the delivery means to allow any desired orientation of the mixing means with respect to the delivery means. The mixing means are able to be held in one hand while valve actuator means which are mounted proximate the mixing means allow the operator with one hand to both orient the mixing means and activate the valve actuator means.

I claim:

1. A device for dispensing a highly viscous multi-component composition including:
  a. a mixing means for mixing the multiple components of the composition together, said mixing means comrising a plurality of mixing segments in an elongated housing in a longitudinal array thereof,
  b. pressurized supply means to supply the separate components from separate sources to the upstream end of the housing at an elevated pressure to force material through the mixing means and to maintain a high pressure in the mixing means,
  c. valve means attached to said housing and adjacent to the mixing segment at the downstream end of the array having an outlet nozzle thereof to dispense the composition to the desired location outside the apparatus at substantially atmospheric pressure and to maximize the pressure drop over said mixing means.

2. A device for dispensing a multi-component composition including:
  a. a mixing means for mixing the multiple components of the composition together,
  b. pressurized supply means to supply the separate components from separate sources to the upstream end of the mixing means at an elevated pressure to force material through the mixing means and to maintain a high pressure in the mixing means,
  c. valve means at the downstream end of the mixing means to dispense the composition to the desired location outside the apparatus and to maximize the pressure drop over said mixing means, and
  d. purge means to recycle at least a first component of the composition from upstream of the mixing means to the respective source of said first component of the composition.

3. The device of claim 2 wherein said purge means further includes means to drive at least one other component through said mixing means when said first component is recycled to its source so that said other component drives the remaining mixture through said mixing means and said valve means to remove said first composition from said mixing means and said valve means.

4. The device of claim 1 wherein said pressurized supply means includes delivery means to transport the components to said mixing means, said device further including swivel fitting means connecting said transport means to said mixing means to allow for any desire orientation of said mixing means.

5. The device of claim 3 wherein said valve means are connected to said mixing means, said valve means further including valve actuation means to actuate said valve, said valve actuation means being proximate said mixing means so that said valve can be actuated when said mixing means is being oriented as desired.

6. The device of claim 1 further including means to maintain pressure on the components in said mixing means when no material is being dispensed through said valve means.

7. In a device for dispensing a highly viscous mixture of component fluids including a plurality of sources of fluid, mixing means comprising a plurality of mixing segments in an elongated housing in a longitudinal array thereof to mix said fluids together to form a substantially mixed composition of said fluids, dispensing means to dispense said composition out of said device and driving means to drive said plurality of fluids at an elevated pressure to the upstream end of the housing, through said mixing means at an elevated pressure and out of said dispensing means at ambient pressure, the improvement comprising the provision of:
attaching means on said housing for attaching said dispensing means to said housing at the downstream end of said mixing array for causing the mixture from said mixing means to pass directly to said dispensing means to a location outside the apparatus at substantially atmospheric pressure to minimize the pressure drop between the mixing means and dispensing means and to maximize the pressure drop through said mixing means.

8. The improved device of claim 7, further including the provision of said dispensing means including valve means for selectively allowing and preventing the flow of mixture through said dispensing means.

9. The improved device of claim 7, further including the provision of means to maintain elevated pressure on said fluids in said mixing means when said valve means is preventing flow through the dispensing means.

10. The improved device of claim 7, further including the provision of delivery means to deliver said fluids to said mixing means and swivel fitting means connecting said mixing means to said delivery means and allowing any desired orientation of said mixing means with respect to said delivery means.

11. The improved device of claim 7 further including the provision of:
said sources of fluid including a plurality of cartridges, and support means to support said cartridges,
said driving means including piston means within each of said cartridges, and ram means to move said piston means in said cartridge so that said piston means apply a pressure on the fluid within each of said cartridge.

12. The improved device of claim 11, further including the provision of said support means including handle means mounted thereon, said handle means including ratchet means to incrementally move said ram means to pressurize said fluids.

13. The improved device of claim 12 further including the provision of said ram means interconnecting said piston means so that movement of said ram means drives each of said piston means an equal distance.

14. The improvement of claim 7 further comprising the provision of:
said mixing means being mounted in a housing, line means comprising at least one line for carrying said plurality of fluids from a source of fluids to one end of the housing, said dispensing means being mounted at the other end of the housing whereby said housing can be oriented to a location adjacent the desired location of fluid dispensing.

15. The improvement of claim 14 further including valve means in said housing between the mixing means and dispensing means for selectively allowing and preventing the flow of mixture through said dispensing means and valve actuation means on said housing for actuating said valve means whereby said valve actuator and housing can be hand-held simultaneously.

16. The improved device of claim 7, further including the provision of said housing being able to be held in one hand, valve means between said dispensing means and said mixing means including valve actuator means mounted on said housing to actuate said valve means so that when said housing is moved to its desired location in one hand, the same hand can operate said valve actuator means.

17. The device of claim 1 wherein said array of mixing segments has an upstream mixing segment adjacent said upstream end of said housing.

* * * * *